United States Patent
Abdul et al.

(10) Patent No.: US 7,533,297 B2
(45) Date of Patent: May 12, 2009

(54) FAULT ISOLATION IN A MICROCONTROLLER BASED COMPUTER

(75) Inventors: Anis M. Abdul, Austin, TX (US); Ajay Kumar Mahajan, Austin, TX (US); Victor Manuel Mena, Jr., Hutto, TX (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 11/531,721

(22) Filed: Sep. 14, 2006

(65) Prior Publication Data

US 2008/0126864 A1    May 29, 2008

(51) Int. Cl.
*G06F 11/00* (2006.01)
(52) U.S. Cl. .................... 714/13; 714/7; 714/9
(58) Field of Classification Search ............. 714/7, 714/9, 13
See application file for complete search history.

(56) References Cited

U.S. PATENT DOCUMENTS

| | | | |
|---|---|---|---|
| 5,163,052 A * | 11/1992 | Evans et al. .................... 714/31 |
| 6,122,756 A | 9/2000 | Baxter et al. |
| 6,202,160 B1 | 3/2001 | Sheikh et al. |
| 6,625,750 B1 | 9/2003 | Duso et al. |
| 6,701,453 B2 | 3/2004 | Chrabaszcz |
| 6,725,396 B2 | 4/2004 | Ahrens et al. |
| 6,732,700 B2 | 5/2004 | Suganuma |
| 6,766,466 B1 * | 7/2004 | Jibbe ............................. 714/4 |
| 6,792,555 B2 | 9/2004 | Sharma |
| 6,931,564 B2 | 8/2005 | Goodman et al. |
| 6,944,788 B2 | 9/2005 | Dinker et al. |
| 2002/0144177 A1 * | 10/2002 | Kondo et al. ................... 714/13 |
| 2006/0056206 A1 * | 3/2006 | Kifuku et al. .................. 363/15 |
| 2007/0067082 A1 * | 3/2007 | Watts .......................... 701/45 |

* cited by examiner

*Primary Examiner*—Scott T Baderman
*Assistant Examiner*—Jigar Patel
(74) *Attorney, Agent, or Firm*—Yee & Associates, P.C.; Casimer K. Salys

(57) ABSTRACT

A method and data processing system for isolating a faulty component in a computer. A first microcontroller detects a fault in a component of a computer. Responsive to detecting the fault, the first microcontroller sets a first fault record for the component to pending fault, sets a second fault record for the first microcontroller to pending fault, and fails over to a second microcontroller. If the second microcontroller detects the fault in the component of the computer, then the first fault record for the component is set to permanent fault, and the second fault record for the first microcontroller is cleared. If the second microcontroller determines the component of the computer does not have the fault, then the first fault record for the component is cleared, and the second fault record for the first microcontroller is set to permanent fault.

6 Claims, 2 Drawing Sheets

FAULT ISOLATION IN A MICROCONTROLLER BASED COMPUTER

BACKGROUND OF THE INVENTION

1. Field of the Invention

The present invention relates generally to data processing systems and in particular to microcontroller based computers. Still more particularly, the present invention relates to a method and system for isolating faulty components in a microcontroller based computer.

2. Description of the Related Art

As the complexity of computers and servers containing multiple processors increases, it is advantageous to use microcontrollers to perform initialization and service operations, including error detection and isolation. In such microcontroller controlled servers, the reliability of the system is dependant on the reliability of the microcontroller. It is therefore advantageous to use two or more microcontrollers to provide redundancy and avoid a single point of failure.

Typically, when using redundant microcontrollers, one microcontroller is designated as the primary microcontroller and the remaining controller or controllers are designated as backup microcontrollers. However, if the primary microcontroller itself has a fault, the microcontroller may erroneously diagnose the server hardware it is controlling as having a fault, resulting in working hardware being replaced while leaving the faulty microcontroller to generate more erroneous diagnoses.

SUMMARY OF THE INVENTION

The different embodiments provide a method and system for isolating a fault in a component of a computer. A first microcontroller detects a fault in a component of a computer. Responsive to detecting the fault in the component of the computer, the first microcontroller (i) sets a first fault record for the component to pending fault, (ii) sets a second fault record for the first microcontroller to pending fault, and (iii) fails over to a second microcontroller. If the second microcontroller detects the fault in the component of the computer then, responsive to detecting the fault, the second microcontroller (i) sets the first fault record for the component to permanent fault, and (ii) clears the fault record for the first microcontroller. If the second microcontroller detects that the component of the computer does not have a fault, then responsive to detecting that the component of the computer does not have a fault, the second microcontroller (i) clears the first fault record for the component, and (ii) sets the second fault record for the first microcontroller to permanent fault.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
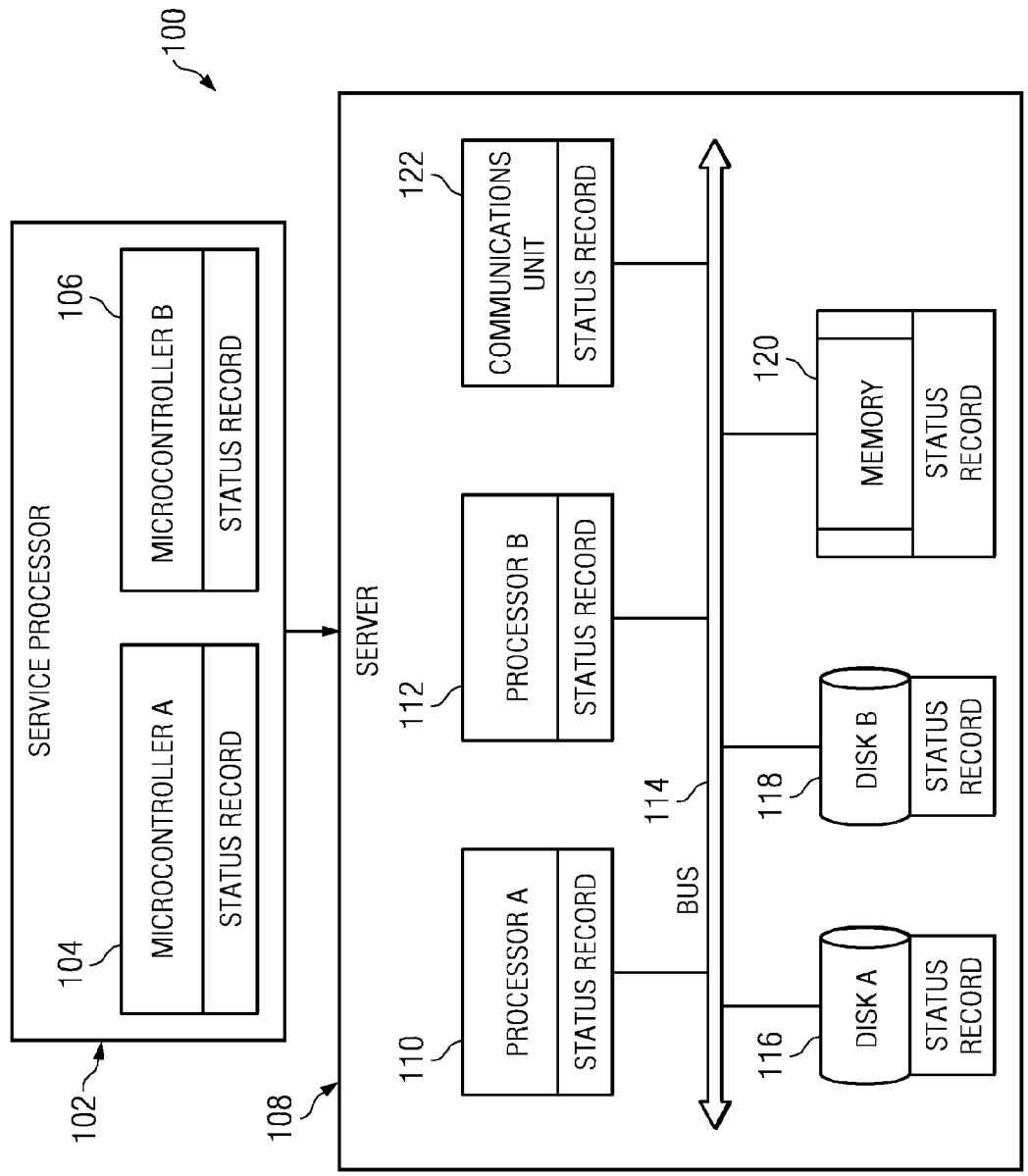
FIG. 1 is a block diagram of a server and service processor in accordance with an illustrative embodiment.

FIG. 1 is provided as an exemplary diagram of a data processing environment in which embodiments may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

When using a microcontroller to perform service operations, such as initialization, to a server or computer it is useful to use two or more microcontrollers to provide redundancy and avoid a single point of failure. Typically, one microcontroller is primary and the remaining microcontroller or microcontrollers are backups. Primary means that the microcontroller is actively performing service operations on the server, while backup means that the microcontroller is in a standby mode, ready to take over if the primary microcontroller fails. If the primary microcontroller has a fault and erroneously diagnoses the server hardware it is controlling as having a fault, then working hardware is erroneously identified as faulty and the faulty microcontroller continues to generate more errors.

When a microcontroller that is servicing a server detects a hardware problem, different embodiments provide for determining whether the microcontroller is faulty or whether the hardware is faulty. A first microcontroller detects a fault in a component of a computer. Responsive to detecting the fault, the first microcontroller (i) sets a first fault record for the component to pending fault, (ii) sets a second fault record for the first microcontroller to pending fault, and then (iii) fails over to a second microcontroller. If the second microcontroller detects the fault in the component of the computer, then responsive to detecting the fault, the second microcontroller sets the first fault record for the component to permanent fault, and clears the second fault record for the first microcontroller. If the second microcontroller determines the component of the computer does not have a fault, then responsive to not detecting a fault, the second microcontroller clears the first fault record for the component, and sets the second fault record for the first microcontroller to permanent fault.

Referring now to FIG. 1, numeral 100 generally designates a block diagram of a server and a service processor in accordance with an illustrative embodiment.

In FIG. 1, service processor 102 comprises microcontroller A 104 and microcontroller B 106, with one designated as the primary and one as the backup. In this example, microcontroller A 104 is designated as the primary (active) and microcontroller B 106 is designated as the backup (standby). Of course, those skilled in the art will appreciate that service processor 102 may have more than two microcontrollers to provide additional redundancy and that two are shown here merely for illustration purposes. Typically, service processor 102 is located inside the same physical enclosure as server 108.

Server 108 comprises processor A 110, processor B 112, bus 114, disk A 116, disk B 118, memory 120, and communications unit 122. For the purpose of illustration, only the main components of a server have been shown here. Additional components of a server, such as graphics card, network card etc. have been omitted for the sake of clarity.

Each component of server 108 that is capable of being replaced in the field is called a field replaceable unit (FRU). Typically, an FRU is one or more circuit boards that can be quickly replaced by service personnel. Each FRU of server 108, microcontroller A 104, and microcontroller B 106 has an associated status record, also known as a fault record. Each FRU's status record has one of three possible states: clear, pending fault, and permanent fault. Clear indicates that the associated component or microcontroller is working. Pending fault indicates that a potential fault was detected and is now pending confirmation. Permanent fault indicates that the component has been confirmed as faulty.

The primary microcontroller, microcontroller A 104 in this example, performs various operations to server 108, such as verifying that all the components of server 108 are working, powering up server 108, loading firmware into server 108, and providing run-time services to server 108. If, while performing an operation to server 108, microcontroller A 104 encounters a problem, then microcontroller A 104 runs tests in order to isolate the faulty FRU(s).

Once microcontroller A 104 has identified the faulty FRU(s), microcontroller A 104 (i) sets the status record associated with each FRU identified as faulty to "pending fault", (ii) sets its own status record to "pending fault", and (iii) performs a failover to the backup microcontroller B 106.

Figure 2:
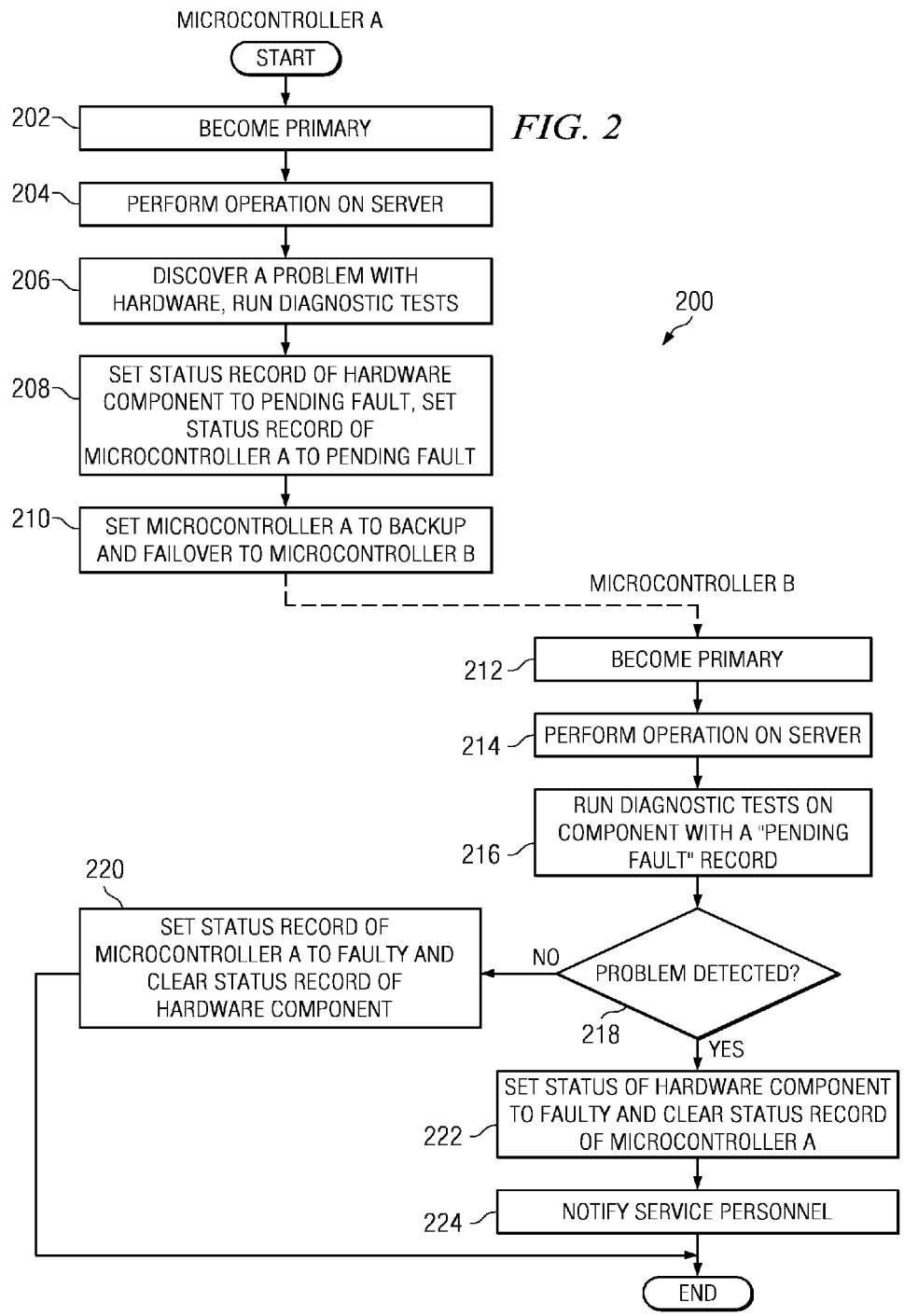
FIG. 2 depicts a flow diagram of the operation of a service processor, as depicted in accordance with an illustrative embodiment.

Referring to FIG. 2, numeral 200 depicts a flow diagram of the operation of a service processor. In this example, microcontroller A is a microcontroller such as microcontroller A 104, and microcontroller B is a microcontroller such as microcontroller B 106 in FIG. 1.

Initially, microcontroller A is the primary and microcontroller B is the backup (step 202). Next, microcontroller A performs one or more operations on a server, such as such as server 108 in FIG. 1. Microcontroller A may perform actions such as hardware verification and initial program load. Typically, microcontroller A will continue to perform operations until microcontroller A encounters a problem (step 204).

When microcontroller A encounters a problem, microcontroller A runs one or more diagnostic tests in order to determine which FRU(s) of the server are faulty (step 206). Once microcontroller A determines which FRU(s) are faulty, microcontroller A sets the status record of the corresponding faulty FRU(s) to "pending fault" (step 208). For example, microcontroller A may set the status record for a disk, such as disk A 116, to "pending fault". Microcontroller A also sets the status record corresponding to itself to "pending fault".

Next, microcontroller A becomes the backup and fails over to microcontroller B (step 210). In other words, microcontroller A, which had control of the server, passes control of the server to microcontroller B. Next, microcontroller B becomes the primary and gains control of the server (step 212). Microcontroller B then performs a service operation, such as hardware verification. Typically, when performing hardware verification, microcontroller B will attempt to communicate with each FRU and read each FRU's associated status record (step 214).

If microcontroller B discovers the status record for one or more FRUs has a "pending fault" record, then, microcontroller B runs one or more diagnostic tests on each FRU with a "pending fault" record to confirm whether the FRU actually has a fault (step 216).

Microcontroller B examines the results of the diagnostic tests to determine whether the tests detected a problem with one or more FRUs (step 218). If no problem was detected, then microcontroller A is faulty and the FRU(s) of the server which microcontroller A erroneously identified as potentially faulty are in fact working properly. Therefore, microcontroller B sets the status record associated with microcontroller A from "pending fault" to "permanent fault", and clears the status record associated with the FRU(s) of the server that were erroneously identified as faulty (step 220).

If, after examining the results of the diagnostic tests, microcontroller B confirms that the FRU(s) of the server with the status of "pending fault" are in fact faulty, then microcontroller A was correct (step 218). Therefore, microcontroller B then clears the status record associated with microcontroller A, and changes the status record associated with each FRU of the server identified as faulty from "pending fault" to "permanent fault" (step 222).

Finally, microcontroller B notifies service personnel of the component(s) of the server identified as having a "permanent fault" so that service personnel can take appropriate action, such as repairing or replacing those components (step 224).

Typically, when a primary microcontroller servicing a server detects a hardware problem, the microcontroller runs tests, isolates one or more FRUs and notifies service personnel. The service personnel replace the FRUs the microcontroller identified as faulty. If the primary microcontroller is working properly, then the preceding process works correctly.

However, if the primary microcontroller is itself faulty and generates spurious results, the microcontroller may erroneously identify working hardware as faulty, resulting in service personnel replacing the wrong FRU. Having working hardware erroneously identified as faulty is wasteful and unproductive for several reasons.

First, replacing FRUs in the server may result in downtime for users, and downtime may be particularly costly if the server is a high availability server. Second, replacing functioning FRUs is a waste of service personnel's time. Third, replacing functioning FRUs depletes spare FRUs. Fourth, the functioning FRUs that are removed are sent back for repair even though they are fully functional. Fifth, the faulty microcontroller is likely to continue to erroneously identify additional FRUs as faulty.

Therefore, it is advantageous to be able to determine whether the hardware is at fault or whether the primary microcontroller is at fault. When the primary microcontroller detects a fault in an FRU, the primary microcontroller: (i) sets a first fault record for the component to pending fault; (ii) sets a second fault record for the first microcontroller to pending fault; and then (iii) fails over to a backup microcontroller. If the backup microcontroller, after becoming the primary, detects the fault in the FRU, then the microcontroller sets the FRU's fault record to permanent fault, and clears the fault record for the microcontroller that is currently the backup. If the microcontroller determines the FRU is not faulty, then the microcontroller clears the FRU's fault record, and sets the backup microcontroller's fault record to permanent fault.

Thus, the previously mentioned problems, created when a faulty microcontroller erroneously identifies a functioning FRU as faulty, may be avoided. Moreover, determining whether the microcontroller is faulty or whether the FRU is faulty is accomplished quickly, with just a few short steps. Specifically, once an FRU is initially identified as faulty, the time required to determine whether the microcontroller or the FRU is faulty is the time it takes to (i) set two fault records, (ii) failover from the primary microcontroller to the backup, and (iii) run a test to determine if the FRU is actually faulty. Also, no additional hardware is required so the present invention may be implemented for little or no additional cost.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for isolating a fault in a computer, the method comprising:

detecting a fault in a component of the computer using a first microcontroller;
responsive to detecting the fault, setting a first fault record for the component to pending fault;
responsive to detecting the fault, setting a second fault record for the first microcontroller to pending fault; and
failing over to a second microcontroller after setting the first fault record and setting the second fault record.

2. The method of claim 1, further comprising:
detecting the fault in the component of the computer using the second microcontroller;
responsive to detecting the fault, setting the first fault record for the component to permanent fault; and
responsive to detecting the fault, clearing the second fault record for the first microcontroller.

3. The method of claim 1, further comprising:
detecting that the component of the computer does not have the fault using the second microcontroller;
responsive to detecting that the component of the computer does not have the fault, clearing the first fault record for the component; and
responsive to detecting that the component of the computer does not have the fault, setting the second fault record for the first microcontroller to permanent fault.

4. A data processing system for isolating a fault in a component of the data processing system, the data processing system comprising:
a bus;
a storage device connected to the bus, wherein the storage device contains computer usable code;
a communications unit connected to the bus;
a processing unit connected to the bus; and
a microcontroller module comprising a first microcontroller and a second microcontroller, wherein the first microcontroller detects a fault in a component of the data processing system, sets a first fault record for the component to pending fault, sets a second fault record for the first microcontroller to pending fault, and fails over to a second microcontroller.

5. The data processing system of claim 4, wherein the second microcontroller detects the fault in the component of the data processing system, sets the first fault record for the component to permanent fault, and clears the second fault record for the first microcontroller.

6. The data processing system of claim 4, wherein the second microcontroller determines the component of the data processing system does not have the fault, clears the first fault record for the component, and sets the second fault record for the first microcontroller to permanent fault.

* * * * *